US010222297B2

(12) United States Patent
Burnett et al.

(10) Patent No.: US 10,222,297 B2
(45) Date of Patent: Mar. 5, 2019

(54) NON-CONTACT INFRARED TEMPERATURE SENSOR FOR HEALTH MONITORING OF ROTORCRAFT BEARINGS

(71) Applicant: Bell Helicopter Textron Inc., Fort Worth, TX (US)

(72) Inventors: Michael Christopher Burnett, Fort Worth, TX (US); Kyle Thomas Cravener, Watauga, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 190 days.

(21) Appl. No.: 15/285,569

(22) Filed: Oct. 5, 2016

(65) Prior Publication Data

US 2018/0095005 A1 Apr. 5, 2018

(51) Int. Cl.
| | | |
|---|---|---|
| *G01M 13/04* | (2006.01) | |
| *F16C 41/00* | (2006.01) | |
| *B64C 27/35* | (2006.01) | |
| *G01J 5/00* | (2006.01) | |

(52) U.S. Cl.
CPC ............ *G01M 13/04* (2013.01); *F16C 41/00* (2013.01); *B64C 27/35* (2013.01); *F16C 2233/00* (2013.01); *F16C 2326/43* (2013.01); *G01J 5/0022* (2013.01)

(58) Field of Classification Search
None
See application file for complete search history.

(56) References Cited

U.S. PATENT DOCUMENTS

| 5,381,692 | A  * | 1/1995  | Winslow ............. | G01M 13/045 340/682 |
| 7,111,981 | B2 * | 9/2006  | Blakeley, III ............ | G01J 5/02 374/121 |
| 7,448,854 | B2 * | 11/2008 | Jolly ..................... | B64C 27/001 415/119 |
| 8,478,480 | B2 * | 7/2013  | Mian .................... | G01M 17/013 250/316.1 |
| 8,626,363 | B2 * | 1/2014  | Kisor ..................... | B64C 27/04 340/945 |
| 9,085,357 | B2   | 7/2015  | Davis et al. | |

(Continued)

OTHER PUBLICATIONS

Picazo-Rodenas, Maria J., Jose Antonino-Daviu, Vicente Climente-Alarcon, Rafael Royo-Pastor, and Ariel Mota-Villar. "Combination of Noninvasive Approaches for General Assessment of Induction Motors." IEEE Transactions on Industry Applications 51, No. 3 (2015): 2172-180. doi:10.1109/tia.2014.2382880.*

*Primary Examiner* — Clayton E. LaBalle
*Assistant Examiner* — Leon W Rhodes, Jr.
(74) *Attorney, Agent, or Firm* — Daniel J. Chalker; Edwin S. Flores; Chalker Flores, LLP

(57) ABSTRACT

The present invention includes an apparatus and method for measuring hysteretic heating or stress of one or more bearings of a craft comprising: one or more non-contact temperature sensors attached to the craft and directed toward the one or more bearings; and a computer connected to the one or more non-contact temperature sensors that measure the temperature, the stress, or both of the one or more bearings before, during, or after operation of the craft, wherein the one or more non-contact temperature sensors measure a change in temperature in the one or more bearings to monitor for heating or stress of the bearings.

27 Claims, 12 Drawing Sheets

(56) References Cited

U.S. PATENT DOCUMENTS

| | | | |
|---|---|---|---|
| 9,145,152 B2* | 9/2015 | Agostini | B61K 9/06 |
| 9,334,048 B2 | 5/2016 | Burnett | |
| 2014/0321501 A1* | 10/2014 | Bartonek | G01J 5/0809 |
| | | | 374/121 |
| 2014/0331753 A1* | 11/2014 | Wiebrecht | G01M 13/04 |
| | | | 73/114.81 |

* cited by examiner

NON-CONTACT INFRARED TEMPERATURE SENSOR FOR HEALTH MONITORING OF ROTORCRAFT BEARINGS

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of bearings, and more particularly, to non-contact temperature sensors for monitoring bearing heating and performance.

BACKGROUND OF THE INVENTION

Without limiting the scope of the invention, its background is described in connection with elastomeric bearings.

U.S. Pat. No. 9,334,048, issued to Burnett, is entitled, "Elastomeric bearing having tapered layers", teaches a rotor hub for an aircraft that includes a yoke, a rotor mast, and a hub spring assembly. The hub spring assembly includes an upper outer member, an upper inner member, and an upper spring member having a plurality of elastomeric layers and shim layers sandwiched between the upper outer member and the upper inner member, the shim layers being tapered such that a thickness of each shim layer is smaller at a side portion as compared to the thickness of the shim at a center portion.

U.S. Pat. No. 9,085,357, issued to Davis and Stamps, is entitled, "Rotor hub bearing system", teaches a bearing system configured for treating and reacting dynamic loading within a rotor hub of rotorcraft. The bearing system includes an outer member having a plurality of alternating outer elastomeric layers and shim layers. The outer member has an inboard surface configured for bonding to an inboard bearing support, and the outer member has an outboard surface configured for bonding to an outboard bearing support. The bearing system has an inner member bonded to an interior surface of the outer member. The inner member can include a rigid inner core, as well as a plurality of elastomeric layers and shim layers configured to react torsional movements of the rotor blade.

SUMMARY OF THE INVENTION

In one embodiment, the present invention includes a method for measuring a temperature of one or more bearings of a craft comprising: positioning one or more non-contact temperature sensors to measure a change in temperature in the one or more bearings; and connecting the one or more non-contact temperature sensors to a computer that received a temperature signal from the one or more non-contact temperature sensors to monitor the temperature, stress, or both, of the one or more bearings before, during, or after craft operations. In one aspect, the one or more non-contact temperature sensors are an infrared heat sensor or a laser heat sensor. In another aspect, the method further comprises providing a pilot with real-time temperature information and warnings to limit craft performance. In another aspect, the computer is a flight control computer of an aircraft. In another aspect, the one or more bearings are selected from a centrifugal force bearing, a hub spring bearing, a laminated rubber bearing, an elastomeric flapping bearing, an elastomeric pitch change bearing, a metal bearing, a composite bearing, a pitch link rod end bearing, a swashplate bearing, a spherical pitch change bearing, or a control system bearings. In another aspect, the computer monitors and displays temperature information in a cockpit of the craft. In another aspect, the two or more non-contact temperature sensors are directed at different portions of the same bearing. In another aspect, the one or more non-contact temperature sensors are movable to measure the temperature of various portions of the same elastomeric bearing or measure the temperature of more than one bearing. In another aspect, the craft is an aircraft, and the aircraft is a fixed-wing aircraft, a helicopter, or a vertical take off and landing rotorcraft. In another aspect, the one or more non-contact temperature sensors provide a sweep of temperature ranges across a surface of the one or more bearings. In another aspect, the one or more bearings are elastomeric or silicone bearings. In another aspect, the non-contact temperature sensors are at least one or wireless, permanent or removable. In another aspect, the change in temperature is heating or cooling. In another aspect, the temperature change is hysteretic, which is caused by a non-linear material such as elastomer or silicone.

In another embodiment, the present invention includes an apparatus that measures heating, cooling, or stress of one or more bearings of a craft comprising: one or more non-contact temperature sensors attached to the craft and directed toward the one or more bearings; and a computer connected to the one or more non-contact temperature sensors that measure the temperature, the stress, or both of the one or more bearings before, during, or after operation of the craft, wherein the one or more non-contact temperature sensors measure a change in temperature in the one or more bearings to monitor for heating or stress of the bearings. In one aspect, the one or more non-contact temperature sensors are an infrared heat sensor or a laser heat sensor. In another aspect, the apparatus further comprises a display that provides a pilot with real-time temperature information and warnings to limit craft performance. In another aspect, the computer is a flight control computer of an aircraft. In another aspect, the one or more bearings are selected from a centrifugal force bearing, a hub spring bearing, a laminated rubber bearing, an elastomeric flapping bearing, an elastomeric pitch change bearing, a metal bearing, a composite bearing, a pitch link rod end bearing, a swashplate bearing, a spherical pitch change bearing, or a control system bearings. In another aspect, the computer monitors and displays temperature and rotor performance information in a cockpit of the craft. In another aspect, two or more non-contact temperature sensors are directed at different portions of the same bearing. In another aspect, the one or more non-contact temperature sensors can be moved to measure the temperature of various portions of the same elastomeric bearing or measure the temperature of more than one bearing. In another aspect, the craft is an aircraft, and the aircraft is a fixed-wing aircraft, a helicopter, or a vertical take off and landing rotorcraft. In another aspect, the one or more non-contact temperature sensors provide a sweep of temperature ranges across a surface of the one or more bearings. In another aspect, the one or more bearings are elastomeric or silicone bearings. In another aspect, the non-contact temperature sensors are at least one or wireless, permanent or removable. In another aspect, the temperature change is hysteretic, which is caused by a non-linear material such as elastomer or silicone.

Yet another embodiment of the present invention includes a method for measuring hysteretic heating of bearings of a craft comprising: identifying one or more bearings of the craft to monitor for heating or stress; positioning one or more non-contact temperature sensors to measure a change in temperature in the one or more bearings; and connecting the one or more non-contact temperature sensors to a computer that monitors the temperature of the one or more bearings and displays the same.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
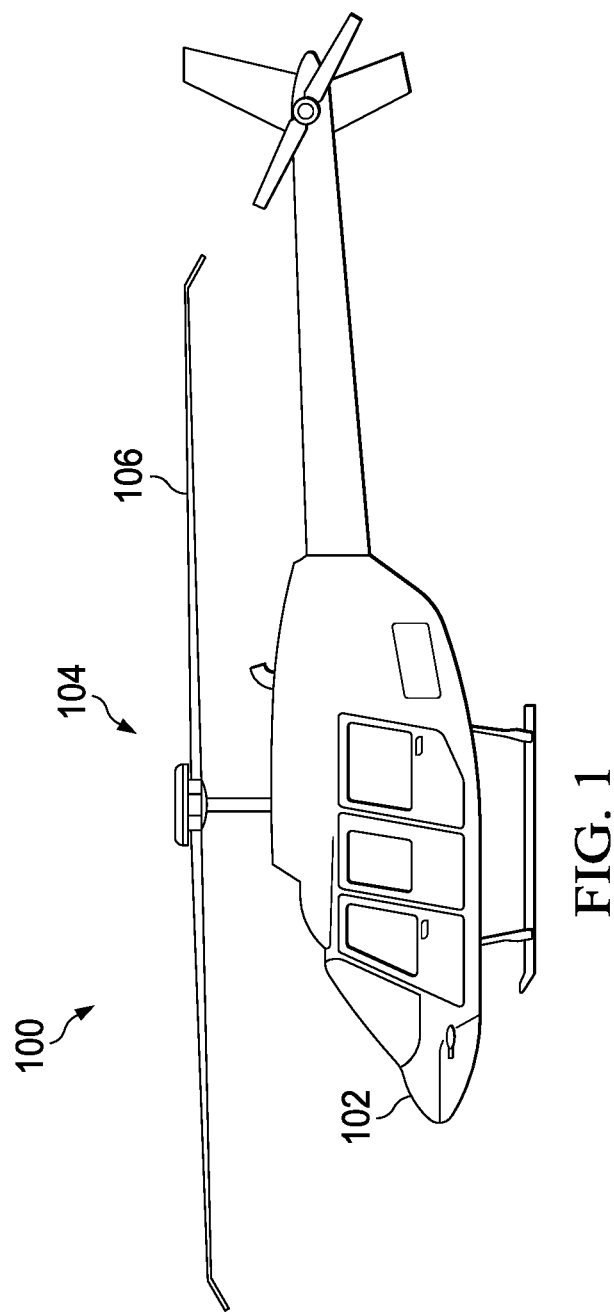
FIG. 1 shows a side view of a helicopter for use of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is directed to an apparatus and method for measuring a change in temperature in a bearing of a craft during operations that provides a user with information about the status of the bearing, e.g., heating, cooling, and/or stress. For example, many craft use elastomeric or silicone materials as part of a bearing in which the temperature change is hysteretic. Generally, hysteretic heating is heat caused by a non-linear material such as elastomer or silicone during operations. For use with the present invention non-contact temperature sensors used in the present invention are positioned to measure at least a portion of a bearing for which temperature information is sought, which sensors can be wired or wireless, can change their position to measure more that one part of a bearing, can be used in sets of 2, 3, 4, 5, 6, 7, 8, 9, 10 or more and can be permanent or removable.

Hysteretic heating of elastomeric bearings has historically presented challenges for rotorcraft, by reducing operational envelope and bearing lives. In the past, empirical methods were developed to predict temperatures of critical bearings, e.g., in the rotor system. These predictions would then be displayed to the pilot, providing real time feedback and warnings to limit the aircraft's performance. This method has improved pilot bearing temperature awareness and bearing life but it is known to be highly conservative. The use of a non-contact IR sensor will provide similar data as the empirical equation, but reduce the known error. This accuracy can improve aircraft performance and further refine the impacts heat can have on bearing life. This data can also be used in the flight control computer (FCC) to limit rotor capability and improve safety and life of the rotor system. The present invention can be used to monitor fixed wing engine mounts or metallic bearings and even swashplate bearings. The present invention is applicable for regular metal bearings, elastomeric bearings, resin bearings, laminated bearings, and combination thereof (e.g., composite bearings), having any shape, e.g., conical, planar, cylindrical, spherical, hemispherical, chevron, spherical, or any combinations thereof. The present invention measures points that are not normally accessible because of, e.g., wiring constraints. The sensors can be integrated in part a part or an assembly.

The present invention embeds any non-contact sensor, e.g., an IR sensor, a laser sensor, or other non-contact sensor, in, on, or about the rotor system to monitor the temperature of critical bearings. The sensor can be mounted in a variety of configurations and due to bearing motion can provide a sweep of temperature ranges across the bearing's surface. This data is then fed back to the FCC where it can be displayed or processed in any range of methods. For example, the data gathered using the present invention simplifies the Flapping Feathering and Rotor Loads (FFR) display and improved the accuracy built into FFR algorithms.

Previously temperatures were estimated, not based on actual temperature. The temperature estimates were based on 1-dimensional heat transfer equations or thermocouples. While thermocouples provide some accuracy, due to bearing motion and heat, they fail frequently and do not provide a robust solution. While using an equation method has been successfully implemented on rotorcraft, the assumptions of boundary conditions and inputs lead to inherently conservative predictions.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles.

Figure 2A:
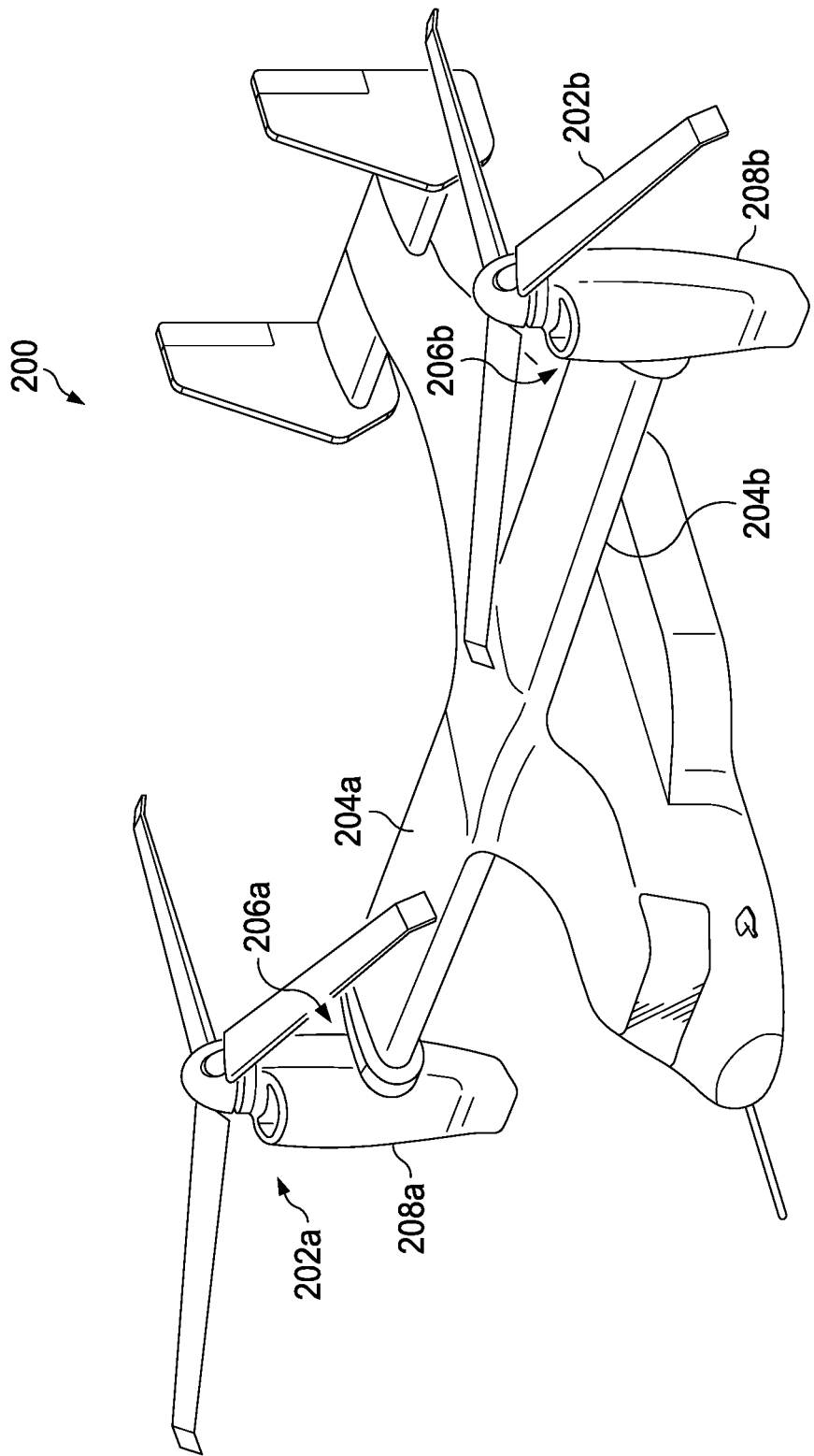
FIG. 2A shows a perspective view of tiltrotor aircraft that can use the present invention.

For example, FIG. 2A shows a tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which carry the engines and transmissions of tilt rotor aircraft 200. Tilt rotor assemblies 202a and 202b move or rotate relative to wing members 204a and 204b between a helicopter or hover mode in which tilt rotor assemblies 208a and 208b are tilted upward, such that tilt rotor aircraft 200 flies like a conventional helicopter; and an airplane or cruise mode in which tilt rotor assemblies 208a and 208b are tilted forward, such that tilt rotor aircraft 200 flies like a conventional propeller driven aircraft.

Figure 2B:
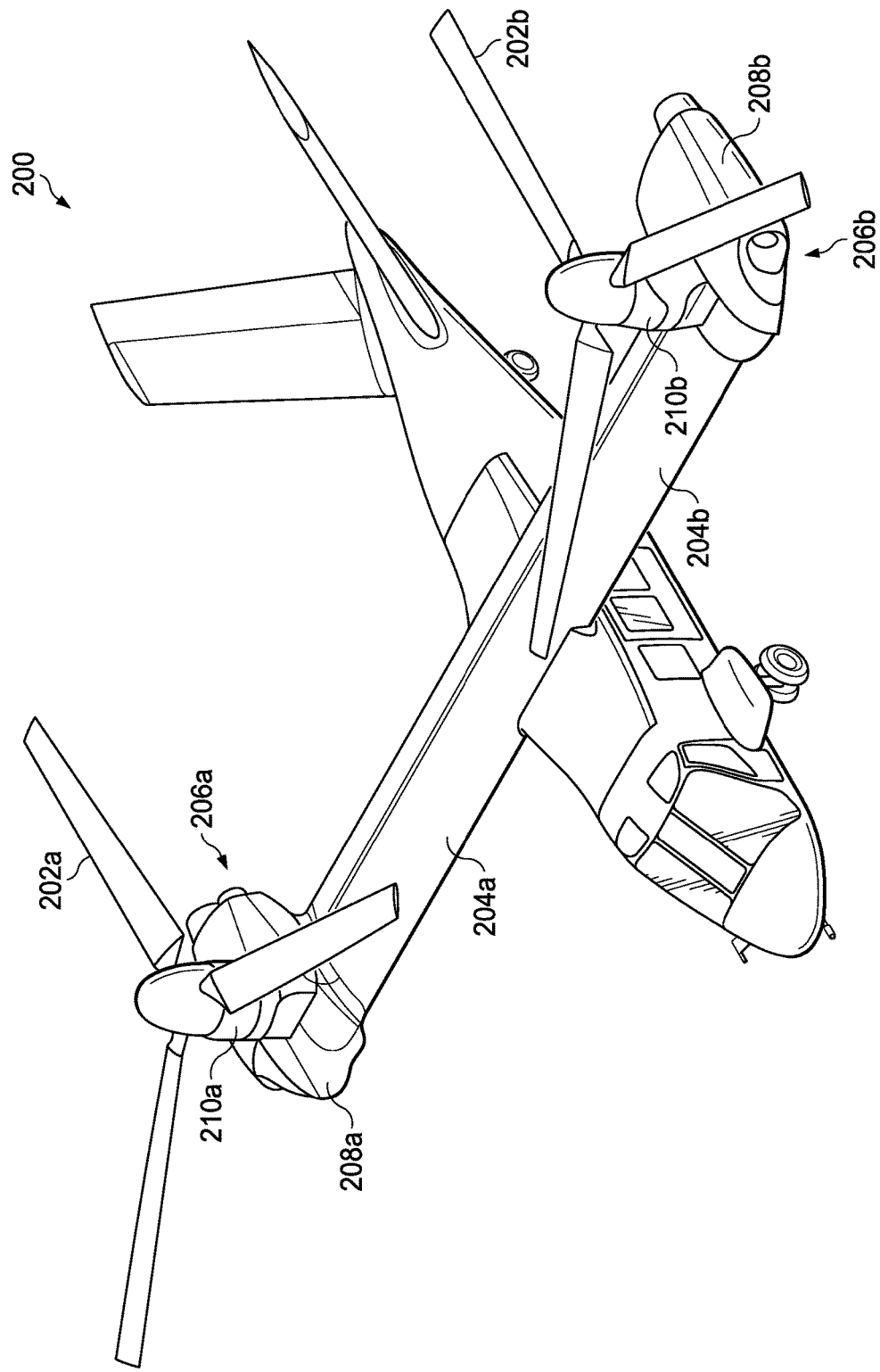
FIG. 2B shows another perspective view of tiltrotor aircraft that can use the present invention.

FIG. 2B shows another tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tilt rotor aircraft 200. In this embodiment, the engines are fixed to the wing and do not rotate, rather, only the pylons 210a and 210b with the rotor assemblies 202a and 202b rotates. Tilt rotor assemblies 202a and 202b move and rotate relative to wing members 204a and 204b and the nacelles 208a and 208b. The tilt rotor assemblies 208a and 208b do not more relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The rotorcraft 200 is still able to fly like a conventional helicopter; and an airplane or cruise mode in which on the rotors are tilted forward, such that tilt rotor aircraft 200 flies like a conventional propeller driven aircraft.

Figure 3A:
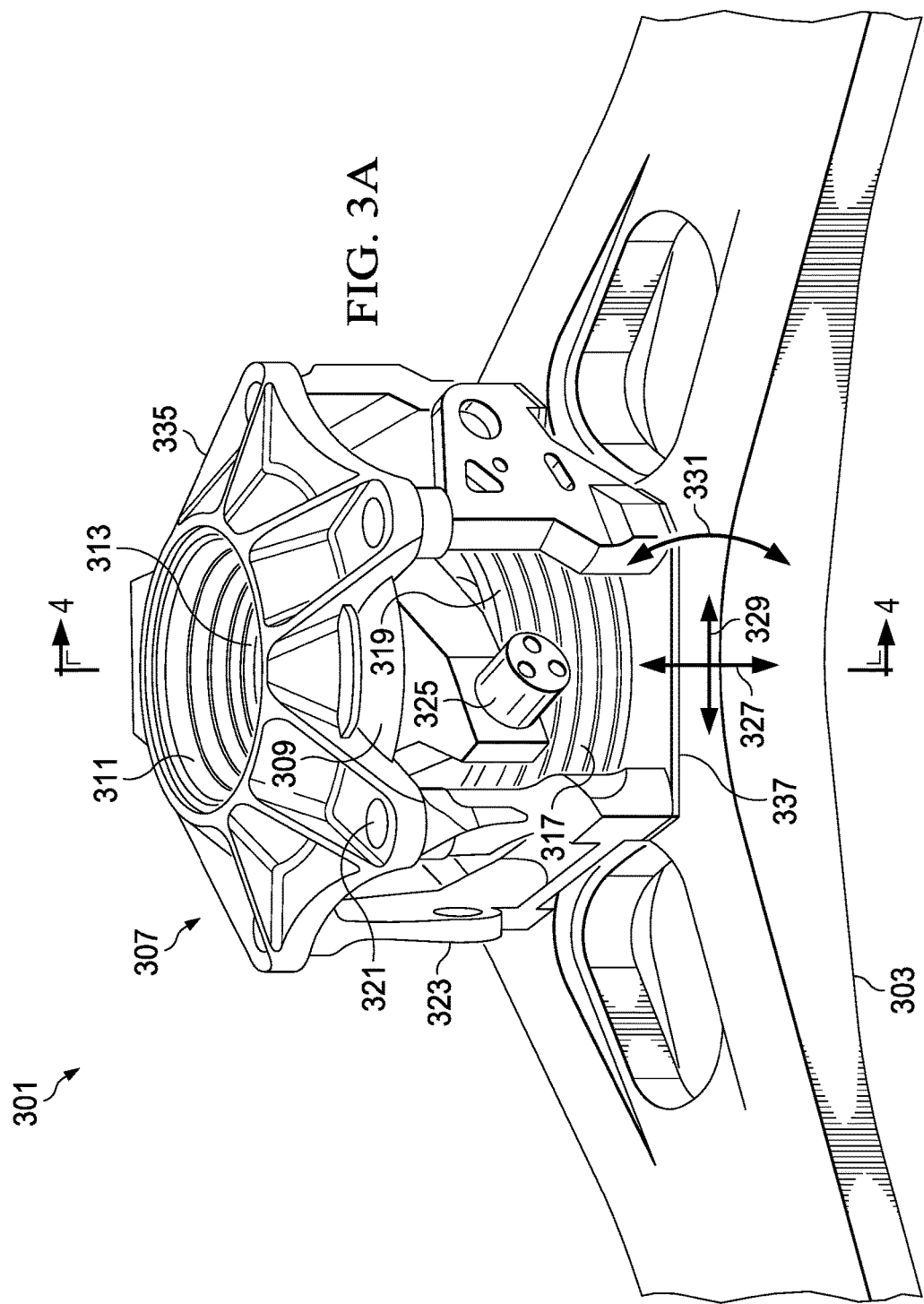
FIG. 3A shows an isometric view of a rotor hub with one example of an embodiment of the present invention.

FIG. 3A shows an isometric view of a rotor hub with one example of an embodiment of the present invention. Rotor hub assembly 301 is shown in relation to yoke 303 having three arms to which rotor blades (not depicted) can be coupled. A hub spring assembly 307 is coupled to yoke 303. Hub spring assembly 307 includes an upper portion having an upper outer member 309, an upper spring member 311, and an upper inner member 313. Hub spring assembly 307 also includes a lower portion having a lower outer member, a lower spring member 317, and a lower inner member 319. Upper outer member 309, upper in member 313, lower outer member, and lower inner member are rigid members. In contrast, upper spring member 311 and lower spring member 317 include alternating shim layers and elastomeric layers that are collectively configured to react operational loads through deformation of the elastomeric layers.

The upper portion 309 is secured by an upper frame 335 that is coupled to the yoke 303 by a plurality of bolts 321 that also rigidly sandwich a plurality of pillow blocks 323 between the upper frame 335 and the yoke 303. An adapter can be utilized between the pillow blocks 323 and the yoke 303, the adapter 337 also acting to secure the lower outer member to the yoke 303. Torque from rotor mast (not depicted) is rigidly transferred to yoke 303 via one or more trunnions, such as trunnion 325, which are coupled to pillow blocks 323 via one or more drive links (not shown for clarity). Such an arrangement prevents the upper spring member 311 and the lower spring member 317 from carrying torque between rotor mast and yoke 303. It should be appreciated that torque can be carried between rotor mast and yoke 303 with any variety of implementation specific devices.

The upper spring member 311 and the lower spring member 317 of hub spring assembly 307 are configured to react solely or in any combination: thrust forces in a thrust direction 327, shear forces in a shear direction 329, and moment forces in a moment direction 331. During operation, a collective change in pitch of rotor blades can impart a thrust load between yoke 303 and rotor mast that which upper spring member 311 and the lower spring member 317 of hub spring assembly 307 is configured to react. Similarly, a cyclic change in the pitch of rotor blades can cause shear and moment loads between yoke 303 and rotor mast which upper spring member 311 and the lower spring member 317 of hub spring assembly 307 is configured to react. It should be appreciated that other operational forces can also cause thrust, shear, and moment loads between yoke 303 and rotor mast.

Figure 3B:
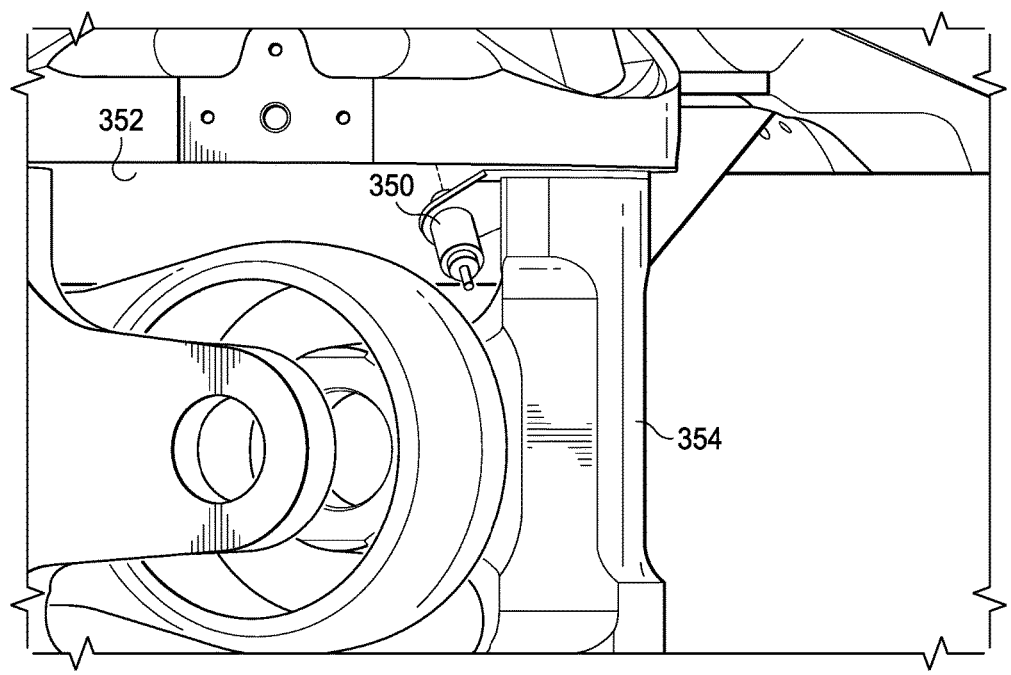
FIG. 3B shows a close-up isometric view of a hub spring infrared (IR) sensor of the present invention.

FIG. 3B shows a close-up isometric view of a hub spring infrared (IR) sensor 350 positioned to monitor the temperature of the elastomeric hub spring 352. The hub spring infrared (IR) sensor 350 is shown on mount 354.

Figure 3C:
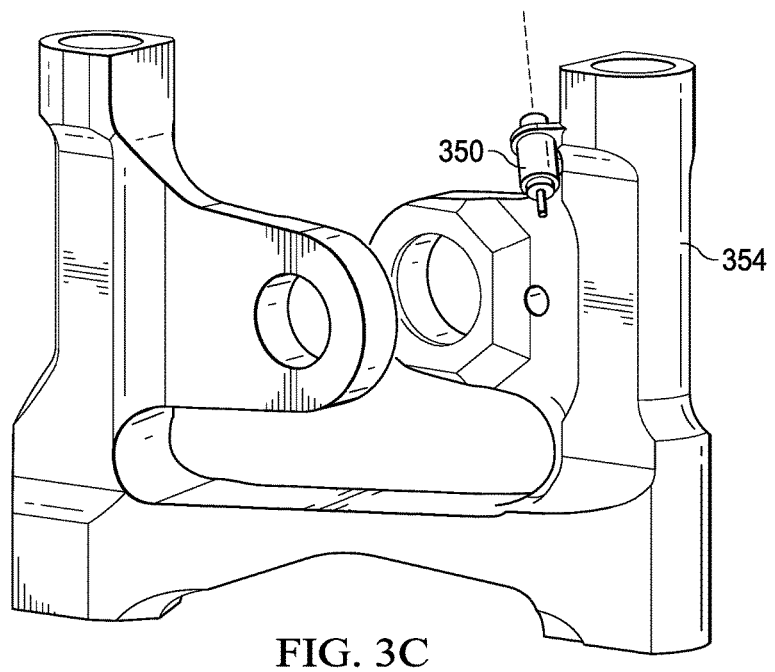
FIG. 3C shows a close-up isometric view of another placement for the hub spring infrared (IR) sensor of the present invention.

FIG. 3C shows a close-up isometric view of another placement for the hub spring infrared (IR) sensor 350 on the mount 354.

Figure 3D:
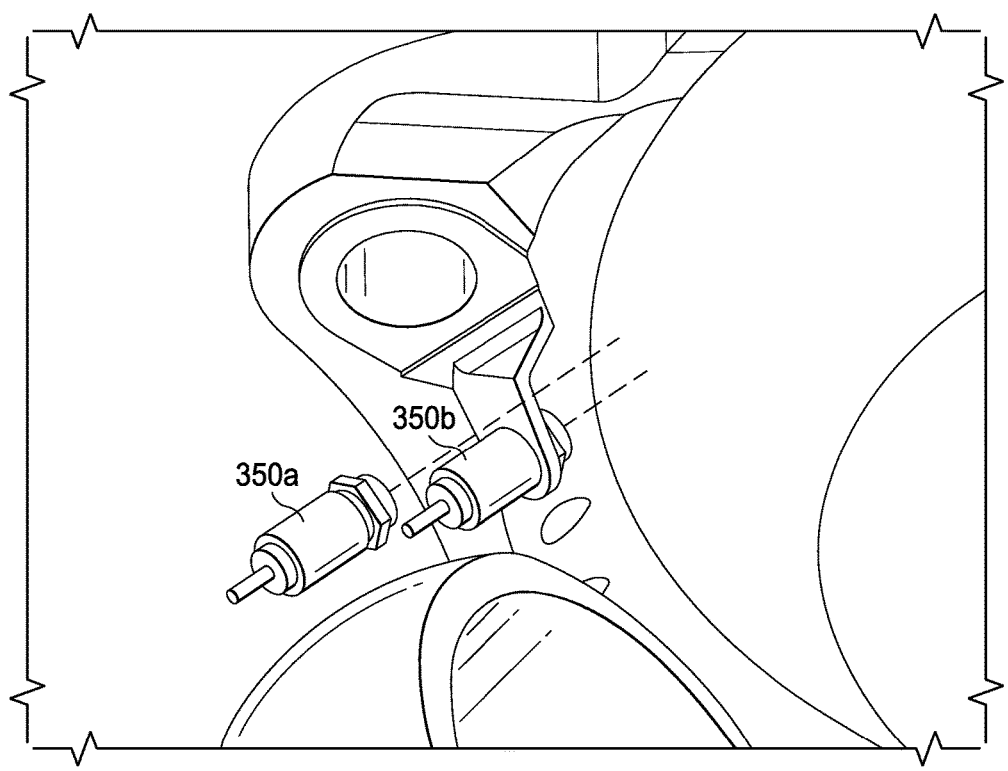
FIG. 3D shows a close-up isometric view of two hub spring infrared (IR) sensors of the present invention.

FIG. 3D shows a close-up isometric view of two hub spring infrared (IR) sensors 350a, 350b. Either or both of the infrared (IR) sensors 350a, 350b could be used to measure different areas of the elastomeric hub spring (not depicted) to provide more detailed data about the different portions of the hub spring.

Figure 4A:
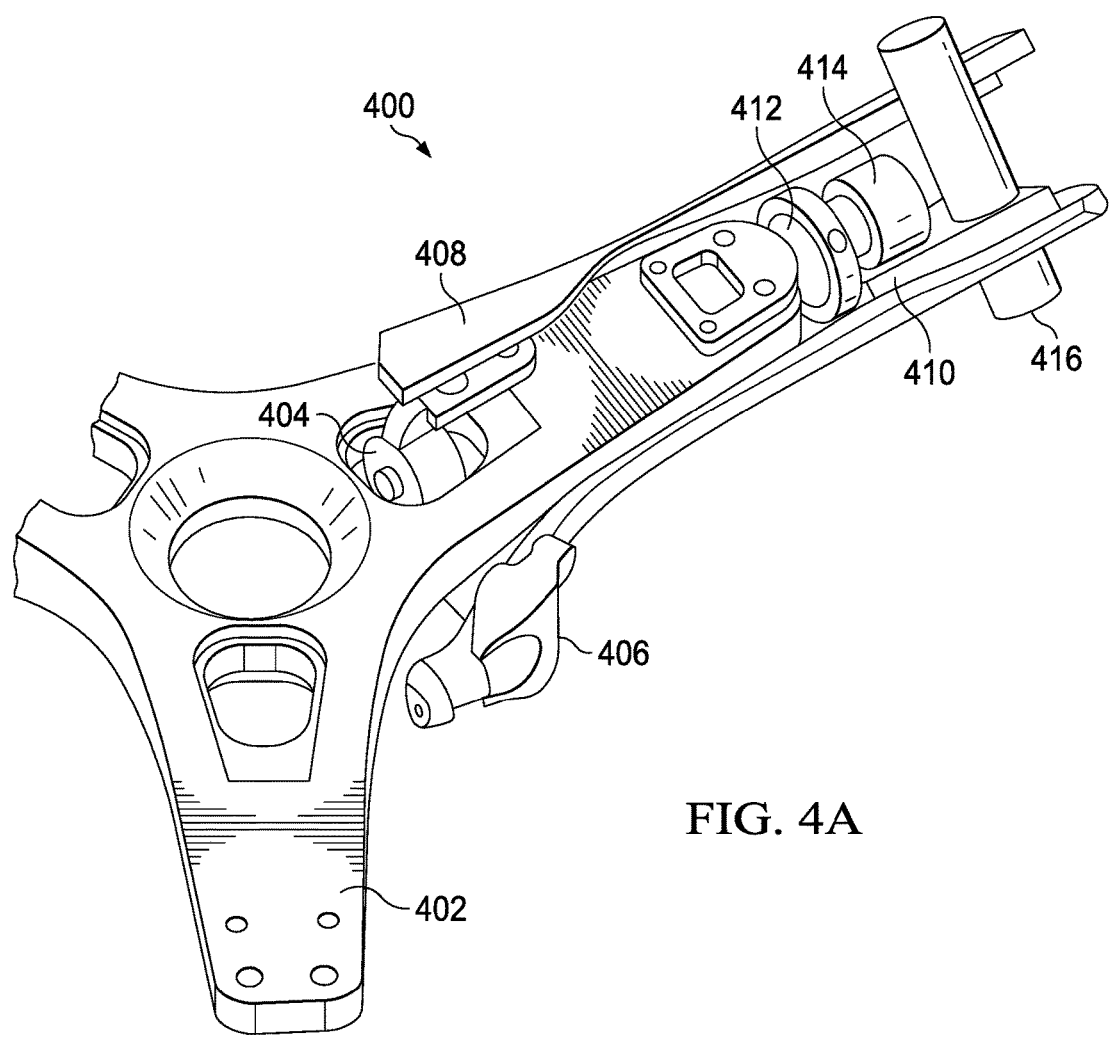
FIG. 4A shows an isometric view of a rotor system with another example of an embodiment of the present invention.

FIG. 4A shows an isometric view of a rotor system 400, that begins with the yoke 402 in relation to the rotor assembly. A pitch bearing and fitting 404 is shown in relation to the yoke 402 and a portion of the pitch horn 406 is shown. In order to visualize the parts, a cut-away view of the grip 408 and a cut-away view of the centrifugal force (CF) fitting 410 is shown. The pitch bearing 412 is shown in relation to the centrifugal force (CF) bearing 414 of the rotor system 400 and the blade-fold bolt 416 of the rotor (not depicted in this view). The present invention finds particular use in detecting the actual temperature of the CF bearing 414 be positioning one or more IR sensors directed at the CF bearing 414 and other parts of the CF assembly.

Figure 4B:
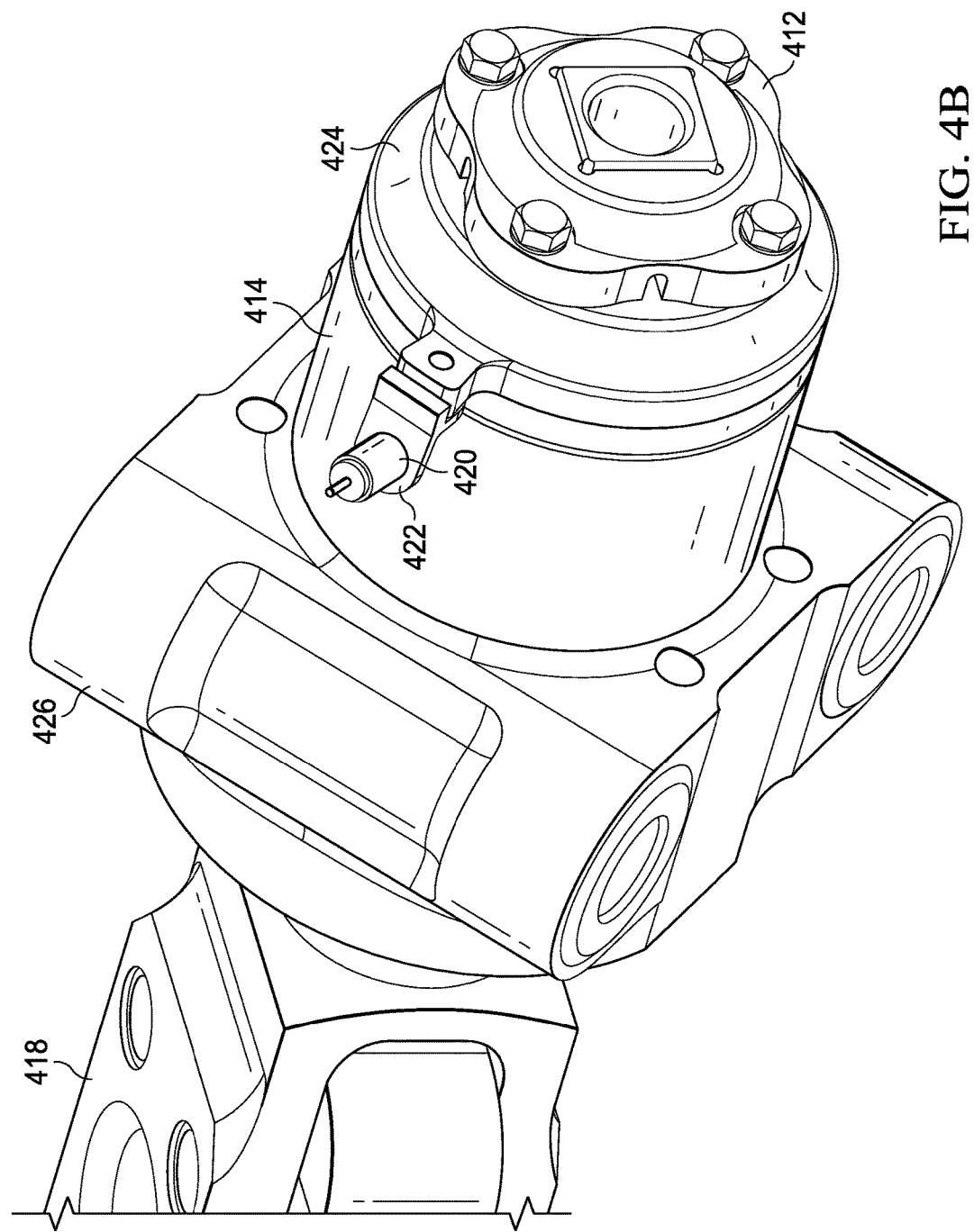
FIG. 4B shows an isometric view of an IR sensor for the centrifugal force (CF) bearing in relation to the rotor.

FIG. 4B shows an isometric view of an IR sensor 420 for the CF bearing 414 in relation to the rotor 418 and its mount 426. The IR sensor 420 is depicted on a permanent fixture 422 that is connected to the grip interface 424 of the CF bearing 414. The skilled artisan will recognize that the direction in which the IR sensor 420 can be varied to measure one or more portions of the CF bearing 414.

Further, while only one IR sensor 420 is depicted, two or more IR sensors can be mounted to the grip interface 424 (not depicted), or one or more IR sensors can be mounted to the rotor mount 426 (not depicted), which could also measure the temperature of the CF bearing 414.

Figure 4C:
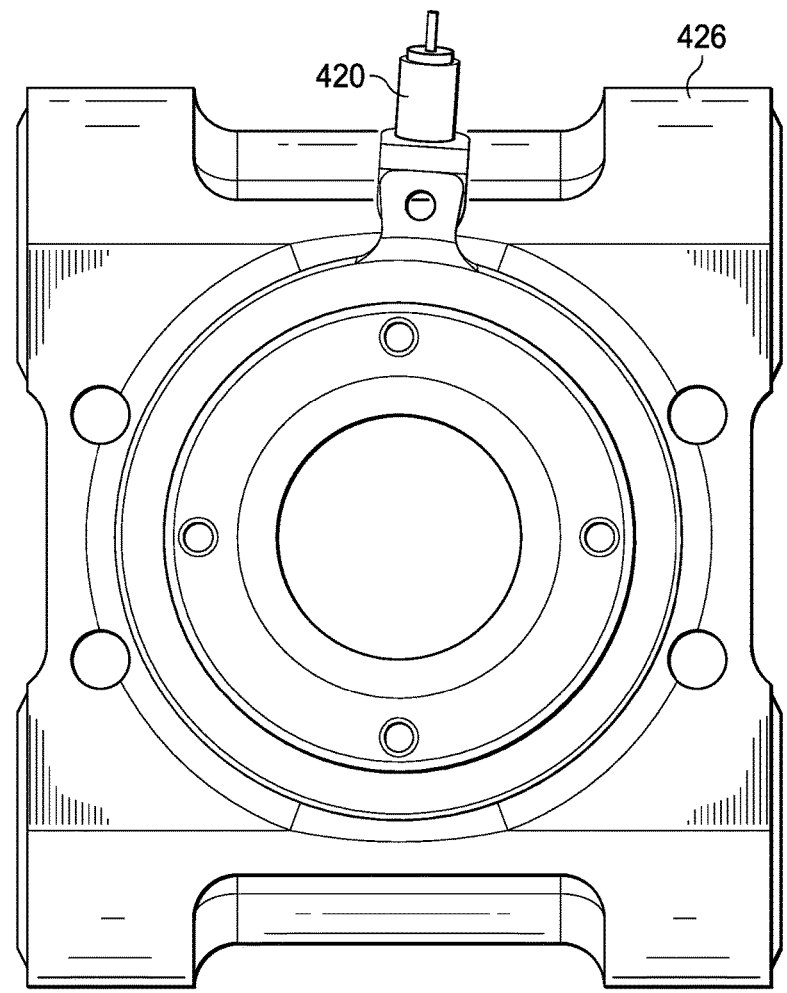
FIG. 4C shows an end view of the connection between the elastomeric CF bearing and the rotor.

FIG. 4C shows an end view of the connection between the elastomeric CF bearing (not depicted) and the rotor (not depicted) as viewed from the mount 426. The line pointing into the interior of the mount 426 is to indicate the direction in which the IR sensor 420 is pointed; it does not depict an actual rod or physical element.

Figure 4D:
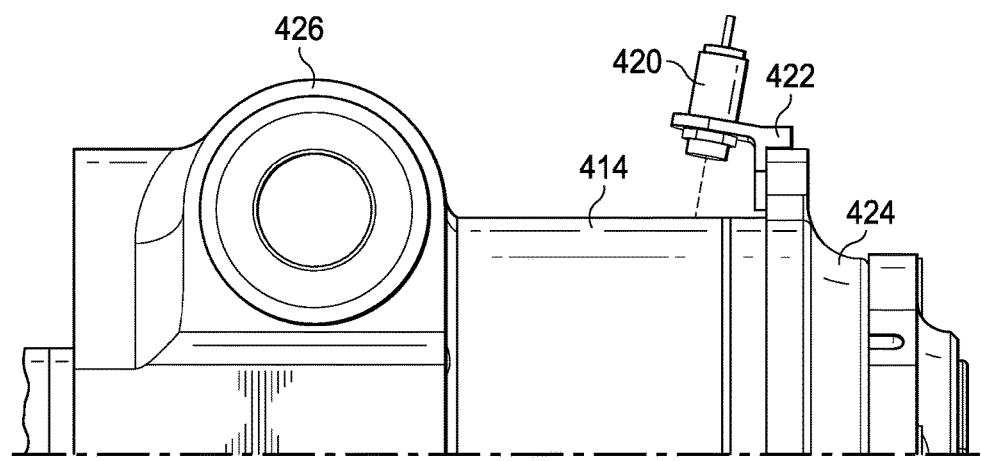
FIG. 4D shows a side view of the IR sensor for the CF bearing in relation to the rotor and the pitch bearing.

FIG. 4D shows a close-up side-view of the IR sensor 420 for the CF bearing 414 in relation to the rotor mount 426 and the grip interface 424 of the CF bearing 414. Again, the line is merely indicating the direction in which the IR sensor 420 is directed.

Figure 5A:
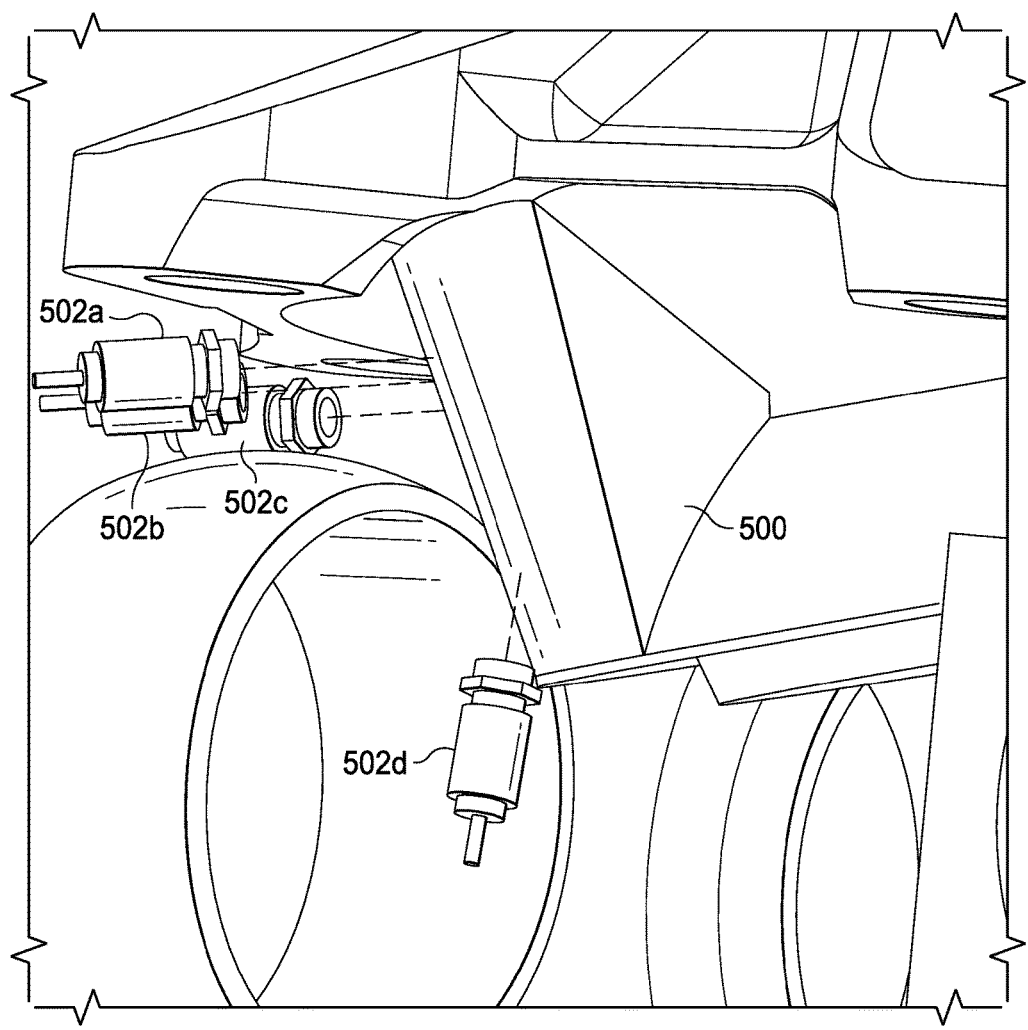
FIGS. 5A and 5B shows alternative positions for one or more IR sensors to measure one or more locations of elastomeric bearings.
Figure 5B:
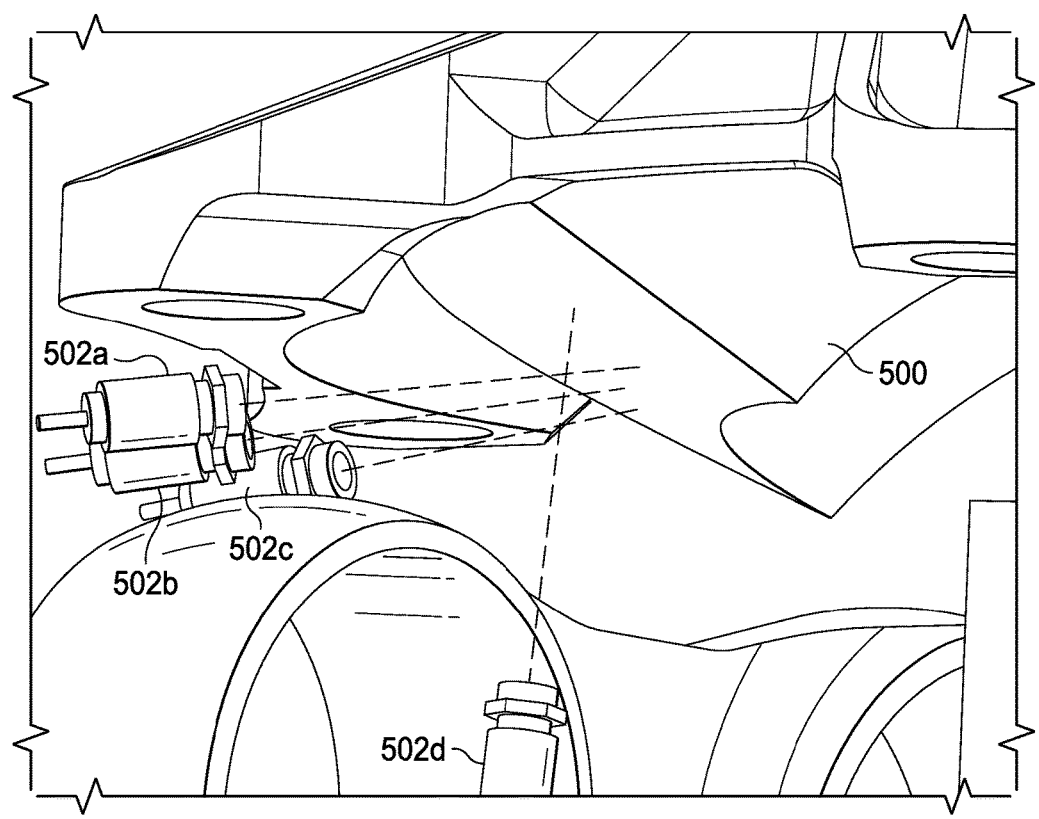

FIGS. 5A and 5B shows alternative positions for one or more IR sensors 502a, 502b, 502c and 502d to measure one or more locations of a conical elastomeric bearing 500, a cross section of which is depicted. For example, the one or more IR sensors 502a, 502b, 502c and 502d, can be positioned to measure the temperature of the elastomeric bearing 500 in-line with the IR sensors 502a, 502b, 502c and 502d. The location of the IR sensor can depend on the shape of the elastomeric bearing and the most common locations for heating and/or stress of the elastomeric bearing. Furthermore, the positions are depicted as exemplary, and the actual number of IR sensors mounted to measure the elastomeric bearing 500 could, be 1, 2, 3, 4, or more depending on the configuration and amount of temperature data needed to measure the temperature from different portions of the elastomeric bearing 500. Again, the lines originating from the IR sensors 502a, 502b, 502c and 502d merely designate the direction in which the IR sensors are measuring temperature and do not indicate a physical portion of the IR sensor.

Figure 6:
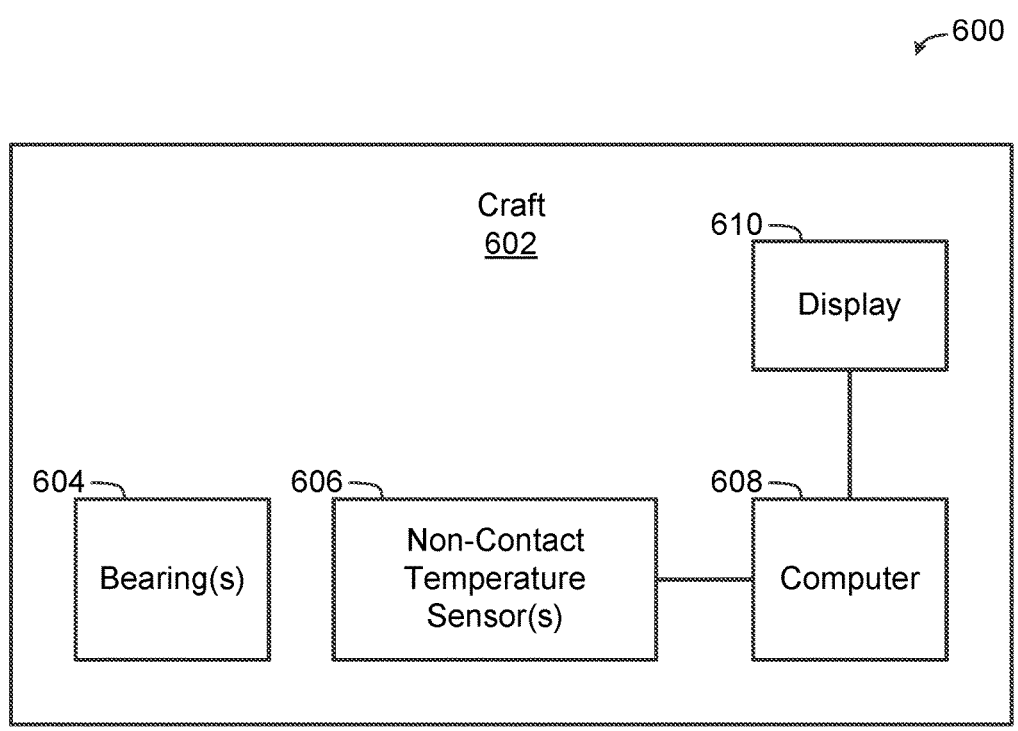
FIG. 6 shows a block diagram of the bearing(s), IR sensor(s), computer and display.

FIG. 6 shows a block diagram 600 of the craft 602 having bearing(s) 604, IR sensor(s) 606, computer 608 and display 610.

The readings obtained by the present invention can be used by the FCC to dynamically adjust flight control rules. For example, the FCC can process the readings (signal) from the sensor to adjust for movement of the bearing, periodic interface from rotating parts, vibration, and even sample at different focal points.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method for measuring a temperature of one or more bearings associated with a rotor assembly of a craft comprising:
    attaching one or more non-contact temperature sensors on the craft to measure a change in temperature in the one or more bearings; and
    connecting the one or more non-contact temperature sensors to a computer;
    receiving a temperature signal from the one or more non-contact temperature sensors; and
    monitoring the temperature, stress, or both, of the one or more bearings in real-time before, during, or after craft operations using the computer and the one or more non-contact temperature sensors.

2. The method of claim 1, wherein the one or more non-contact temperature sensors are an infrared heat sensor or a laser heat sensor.

3. The method of claim 1, further comprising providing a pilot with real-time temperature information and warnings to limit craft performance.

4. The method of claim 1, wherein the computer is a flight control computer of an aircraft.

5. The method of claim 1, wherein one or more bearings are selected from a centrifugal force bearing, a hub spring bearing, a laminated rubber bearing, an elastomeric flapping bearing, an elastomeric pitch change bearing, a metal bearing, a composite bearing, a pitch link rod end bearing, a swashplate bearing, a spherical pitch change bearing, or a control system bearings.

6. The method of claim 1, wherein the computer monitors and displays temperature information in a cockpit of the craft.

7. The method of claim 1, wherein the one or more non-contact temperature sensors comprise two or more non-contact temperature sensors directed at different portions of the same bearing.

8. The method of claim 1, wherein the one or more non-contact temperature sensors are movable to measure the temperature of various portions of the same elastomeric bearing or measure the temperature of more than one bearing.

9. The method of claim 1, wherein the craft is an aircraft, and the aircraft is a fixed-wing aircraft, a helicopter, or a vertical take off and landing rotorcraft.

10. The method of claim 1, wherein the one or more non-contact temperature sensors provide a sweep of temperature ranges across a surface of the one or more bearings.

11. The method of claim 1, wherein the one or more bearings are elastomeric or silicone bearings.

12. The method of claim 1, wherein the non-contact temperature sensors are wireless, permanent or removable.

13. The method of claim 1, wherein the change in temperature is heating or cooling.

14. An apparatus that measures heating, cooling, or stress of one or more bearings associated with a rotor assembly of an aircraft comprising:
    one or more non-contact temperature sensors attached to the aircraft and directed toward the one or more bearings; and
    a computer connected to the one or more non-contact temperature sensors that measure the temperature, the stress, or both of the one or more bearings in real-time before, during, or after operation of the aircraft, wherein the one or more non-contact temperature sensors measure a change in temperature in the one or more bearings to monitor for heating or stress of the bearings in real-time before, during, or after operation of the aircraft.

15. The apparatus of claim 14, wherein the one or more non-contact temperature sensors are an infrared heat sensor or a laser heat sensor.

16. The apparatus of claim 14, wherein the apparatus further comprises a display that provides a pilot with real-time temperature information and warnings to limit aircraft performance.

17. The apparatus of claim 14, wherein the computer is a flight control computer of the aircraft.

18. The apparatus of claim 14, wherein the one or more bearings are selected from a centrifugal force bearing, a hub spring bearing, a laminated rubber bearing, an elastomeric flapping bearing, an elastomeric pitch change bearing, a metal bearing, a composite bearing, a pitch link rod end bearing, a swashplate bearing, a spherical pitch change bearing, or a control system bearings.

19. The apparatus of claim 14, wherein the computer monitors and displays temperature and rotor performance information in a cockpit of the aircraft.

20. The apparatus of claim 14, wherein the one or more non-contact temperature sensors comprise two or more non-contact temperature sensors are directed at different portions of the same bearing.

21. The apparatus of claim 14, wherein the one or more non-contact temperature sensors can be moved to measure the temperature of various portions of the same elastomeric bearing or measure the temperature of more than one bearing.

22. The apparatus of claim 14, wherein the aircraft is a fixed-wing aircraft, a helicopter, or a vertical take off and landing rotorcraft.

23. The apparatus of claim 14, wherein the one or more non-contact temperature sensors provide a sweep of temperature ranges across a surface of the one or more bearings.

24. The apparatus of claim 14, wherein the one or more bearings are elastomeric or silicone bearings.

25. The apparatus of claim 14, wherein the non-contact temperature sensors are at least one or wireless, permanent or removable.

26. A method for measuring hysteretic heating or cooling of bearings associated with a rotor assembly of an aircraft comprising:
    identifying one or more bearings of the aircraft to monitor for heating or stress;
    attaching one or more non-contact temperature sensors on the aircraft to measure a change in temperature in the one or more bearings;
    connecting the one or more non-contact temperature sensors to a computer;

receiving a temperature signal from the one or more non-contact temperature sensors; and monitoring the temperature of the one or more bearings in real-time using the computer and displaying the same before, during, or after aircraft operations.

27. The method of claim 26, wherein the non-contact temperature sensors are wireless, permanent or removable.

* * * * *